Aug. 9, 1966  E. P. FANTER  3,265,285
CARTON
Filed Aug. 12, 1963  7 Sheets-Sheet 1
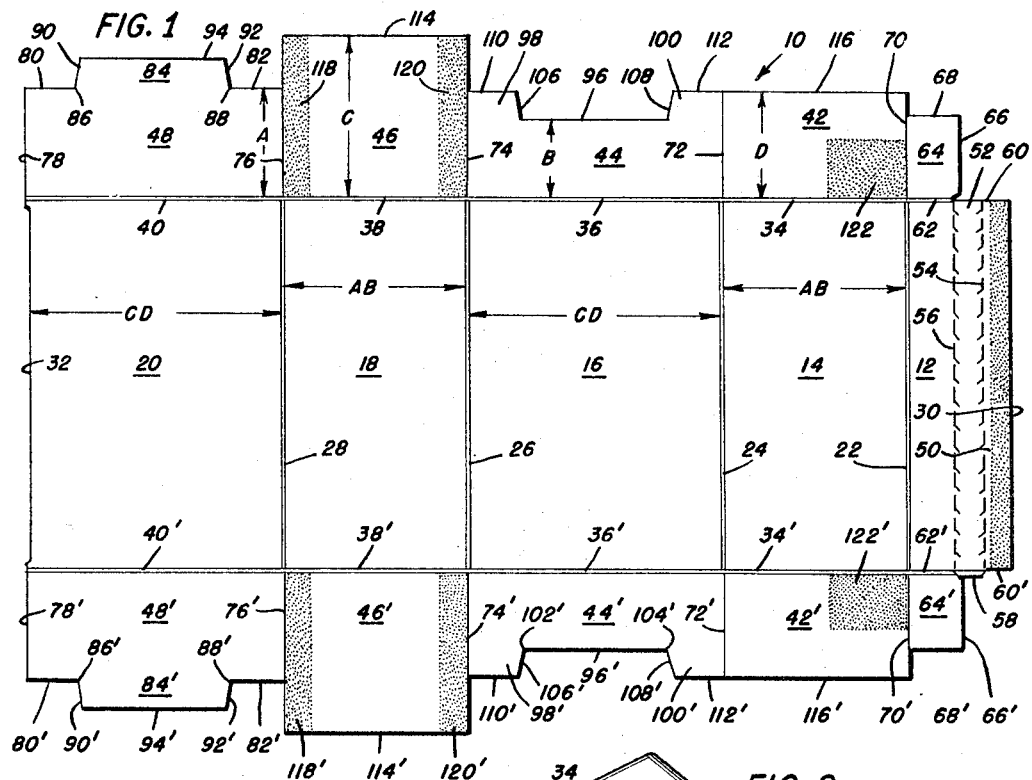
FIG. 1
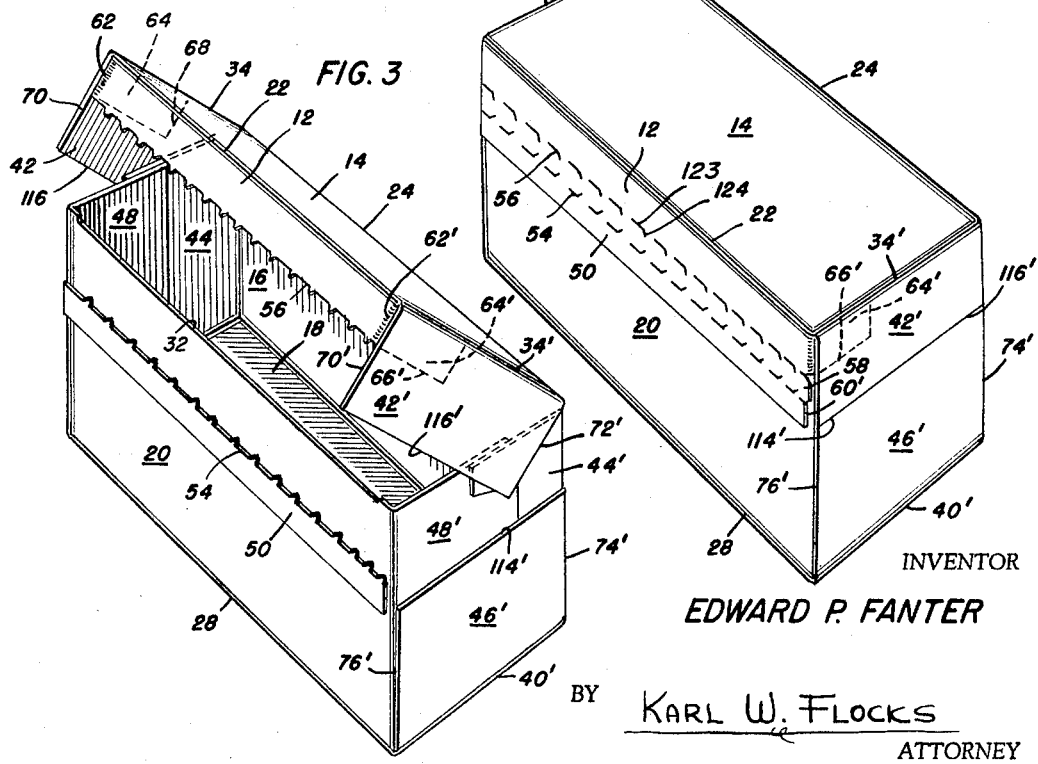
FIG. 2
FIG. 3
INVENTOR
EDWARD P. FANTER
BY  KARL W. FLOCKS
ATTORNEY Aug. 9, 1966          E. P. FANTER          3,265,285
CARTON
Filed Aug. 12, 1963          7 Sheets-Sheet 2
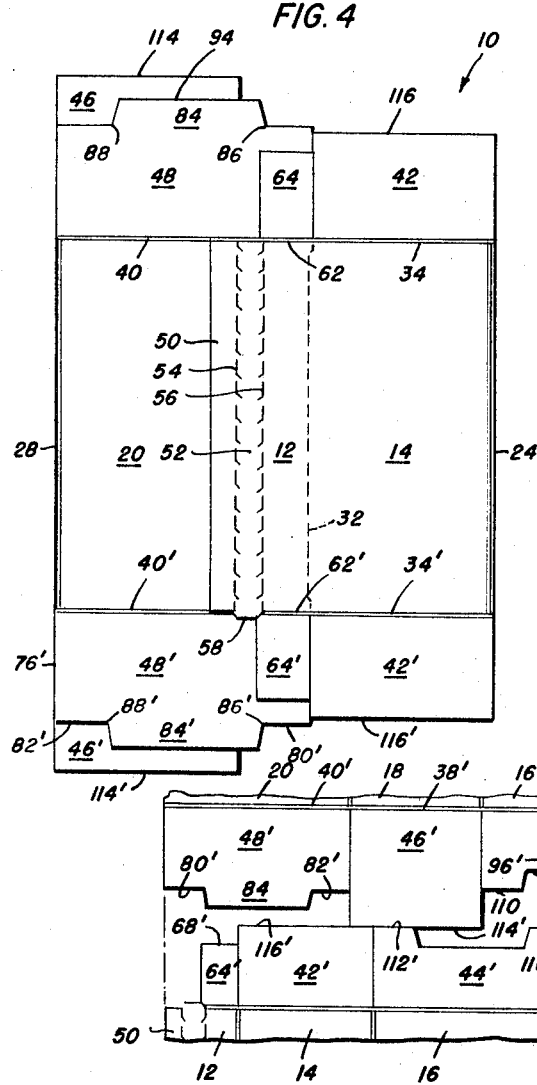
FIG. 4
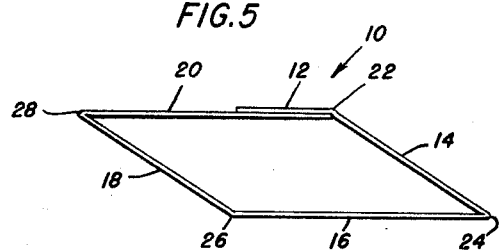
FIG. 5
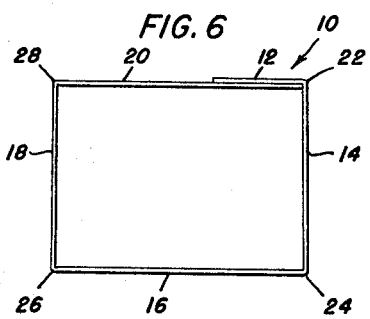
FIG. 6
FIG. 7
INVENTOR
EDWARD P. FANTER
BY    KARL W. FLOCKS
ATTORNEY Aug. 9, 1966 E. P. FANTER 3,265,285
CARTON Filed Aug. 12, 1963 7 Sheets-Sheet 3

INVENTOR
EDWARD P. FANTER

BY KARL W. FLOCKS
ATTORNEY

Aug. 9, 1966   E. P. FANTER   3,265,285
CARTON
Filed Aug. 12, 1963   7 Sheets-Sheet 4
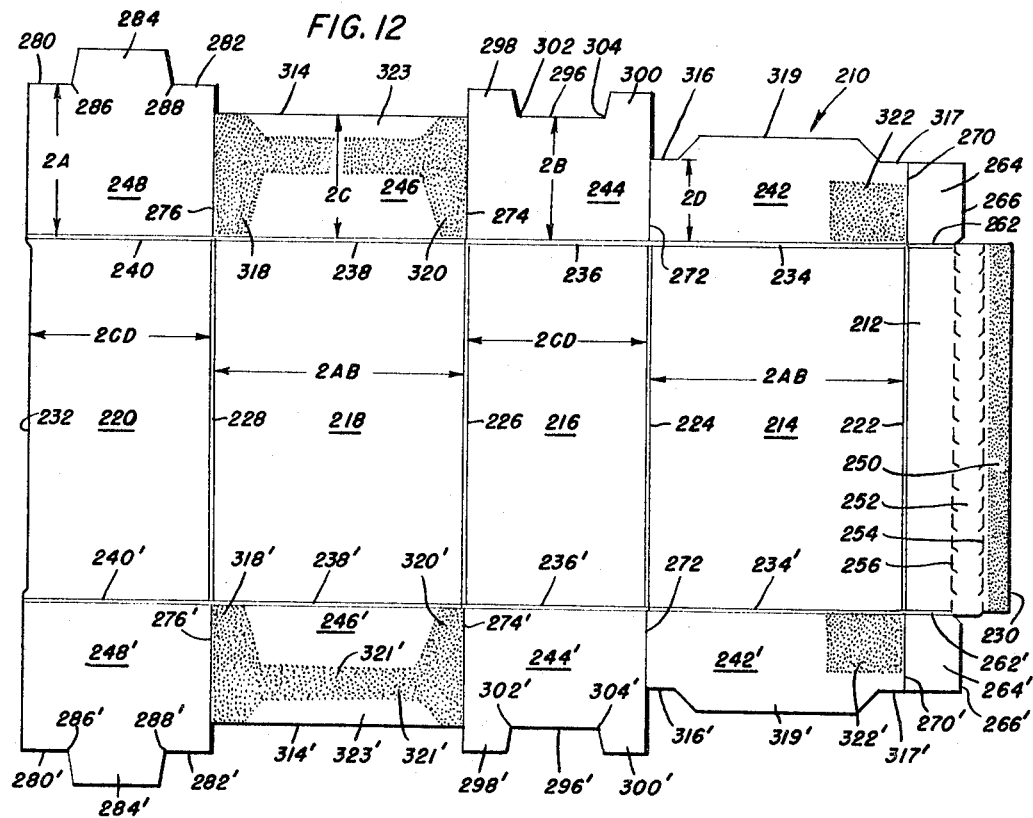
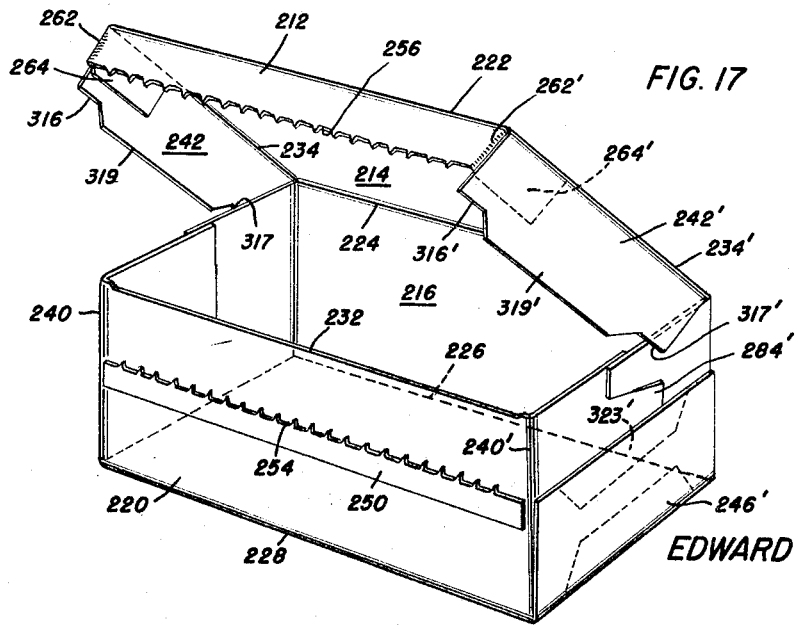
INVENTOR
EDWARD P. FANTER
BY KARL W. FLOCKS
ATTORNEY Aug. 9, 1966 E. P. FANTER 3,265,285
CARTON
Filed Aug. 12, 1963 7 Sheets-Sheet 5
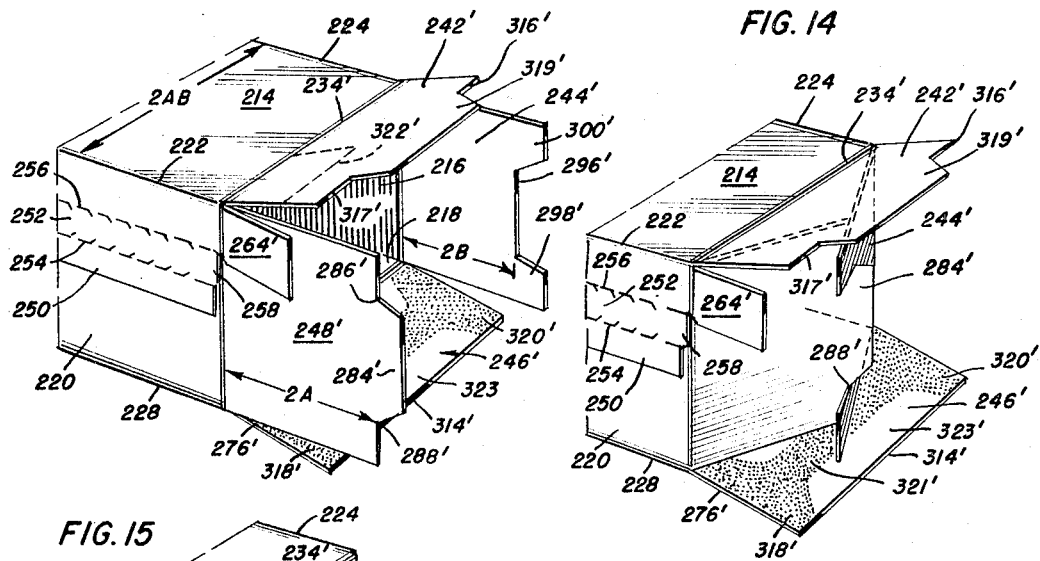
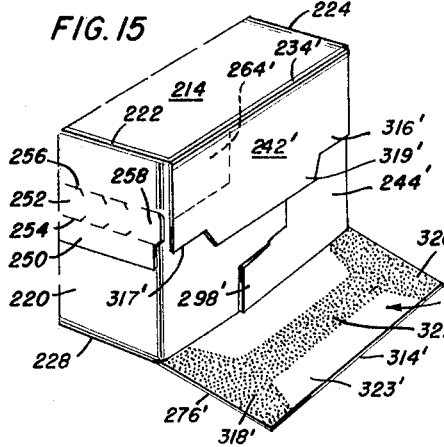
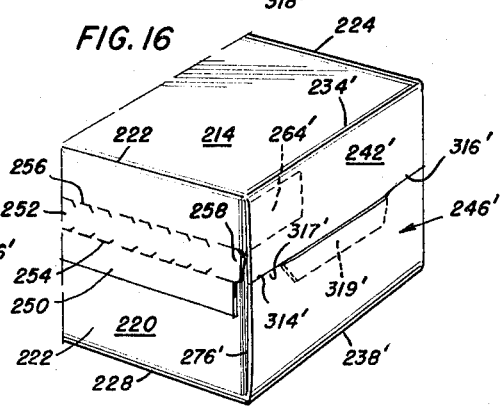
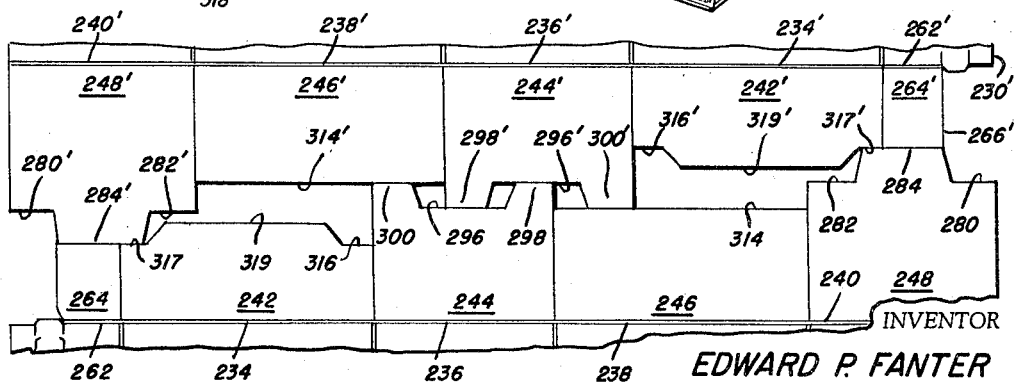
INVENTOR
EDWARD P. FANTER
BY KARL W. FLOCKS
ATTORNEY Aug. 9, 1966  E. P. FANTER  3,265,285

CARTON

Filed Aug. 12, 1963  7 Sheets-Sheet 6

INVENTOR
EDWARD P. FANTER

BY  KARL W. FLOCKS
ATTORNEY

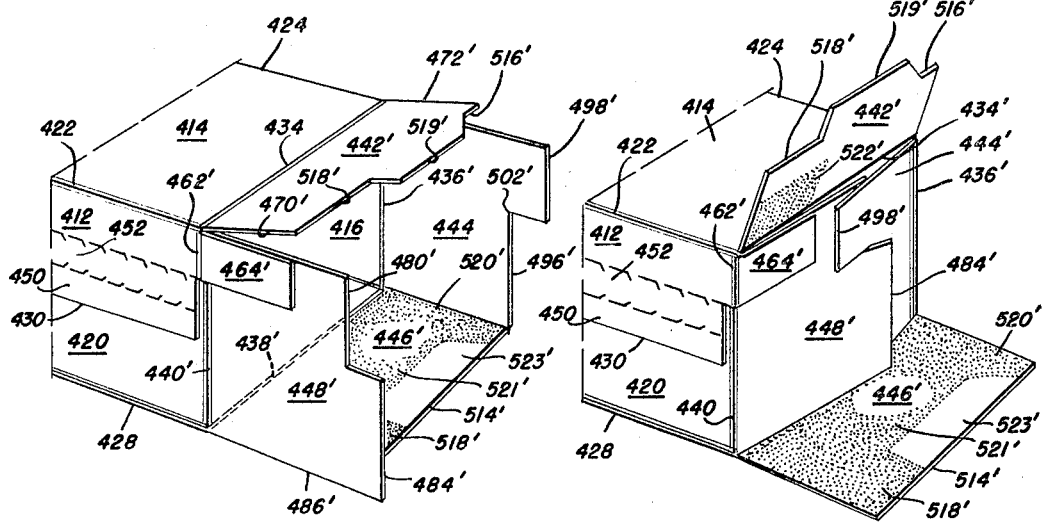

United States Patent Office 3,265,285
Patented August 9, 1966

3,265,285
CARTON
Edward P. Fanter, Elmhurst, N.Y., assignor to Diamond International Corporation, New York, N.Y., a corporation of Delaware
Filed Aug. 12, 1963, Ser. No. 301,373
6 Claims. (Cl. 229—51)

This invention relates to improved cartons particularly adapted for packaging an initially viscous material which will subsequently be frozen into a substantially solid state, particularly ice cream, for example.

Rectangular ice cream cartons have previously been erected and filled on what has come to be recognized in the field as standard equipment. The equipment used to erect and fill ice cream cartons constitutes a considerable investment and the manner in which the apparatus functions, i.e., closure flap folding sequence, etc., has in a sense dictated the shape and sequence of manipulation of the end flaps of ice cream cartons of the type involved.

Cartons in which various products are packed play an important part in the sale of the goods. A well shaped, form-retaining carton inherently suggests a quality product while a mis-shaped carton may be a psychological deterrent to the purchaser.

A constant goal of the packaging industry is to provide cartons which use a minimum amount of material to afford economies of packaging overhead, i.e. cartons which are of a substantially simple shape so that a minimum amount of cutting and scoring is involved during production; cartons which are readily erected on standard equipment to cause a minimum of expense and conversion of expensive plant equipment; and cartons which, as in the case of ice cream, safely maintain the material therein in a protected condition but require a minimum effort on the part of the user to gain ready and complete access to the contents of the carton.

Primary objects of the present invention are as follows:

(1) Provide a carton which is tightly sealed and reclosable as well as tamper-proof;

(2) Provide a carton which is attractive in appearance when erected and packed;

(3) Provide a carton and blank which utilizes a minimum of stock or board material;

(4) Provide a carton which has an improved end closure assembly;

(5) Provide a carton which is uniform in dimension to permit storage and shipping in uniformly constructed shipping containers with a minimum loss of shipping space and damage to the packed cartons and goods therein;

(6) Provide a carton which has a novel end closure assembly providing a base facilitating sealing of the end closure assembly during erection, loading and closing of the carton;

(7) Provide a carton including an improved end closure assembly facilitating opening and closing of the carton, as well as to provide convenient and maximum access to the product packaged in the carton;

(8) Provide a novel blank for producing a carton which involves a minimum of gluing and includes substantially uniformly disposed fold lines and a minimum of panel brakes to facilitate maximum application of art work on the cartons;

(9) Provide a carton which includes a novel end closure assembly, facilitating the staggered or meshed relationship of adjacent carton blanks during layout and production of the same to accordingly afford economy in the amount of material used to produce the carton;

(10) Provide a carton including an improved end closure assembly which provides a base during the folding sequence of the end closure flaps, which permits the use of a minimum amount of adhesive during the erection of the carton and affords further economies of manufacture;

(11) Provide a carton which incorporates an improved end closure assembly substantially orienting and maintaining the carton in a squared condition;

(12) Provide a carton which includes tear strip means on a retaining panel to facilitate the ready opening of the carton for gaining access to the contents thereof; and

(13) Provide a carton including an improved end closure assembly which includes a pair of interlocked, free-edge, inner closure flaps receiving thereon a pair of outer closure flaps, the inner and outer closure flaps including portions orienting the carton into a uniformly maintained rectangular cross-sectioned carton.

Other and more specific objects and the nature and advantages of the present invention will become apparent from the following description taken in conjunction with the accompanying drawings forming a part thereof, in which:

FIG. 1 is a plan view of a one-piece blank used to produce one embodiment of the novel carton;

FIG. 2 is a perspective view of a sealed carton erected from the blank of FIG. 1;

FIG. 3 is a perspective view of the carton of FIG. 2 in an opened condition;

FIG. 4 is a plan view of a partially assembled carton blank, showing the condition thereof prior to sealing and filling the same, i.e. the preassembled condition of the carton;

FIG. 5 is an end view of FIG. 4, i.e. looking in at the lower end of FIG. 4, and showing the carton panels in an intermediate stage of orientation and erection;

FIG. 6 is an end view similar to FIG. 5 showing the carton panels oriented into right angular relationship;

FIG. 7 is a fragmentary plan view of the similar end portions of the blank of FIG. 1, shown in the inverted or reversed relationship in which they are "laid out" on the cutting and scoring dies to afford economies of board stock;

FIG. 12 is a plan view of a one-piece blank used to produce another embodiment of the novel carton in which an access opening across the maximum width of the carton is provided;

FIG. 13 is a perspective view similar to FIG. 8 showing the pre-assembled blank of FIG. 12 prior to sealing the end closure assembly of the carton;

FIG. 14 is a perspective view similar to FIG. 9 showing the inner closure flaps being folded toward sealing and orienting relation;

FIG. 15 is a perspective view similar to FIG. 10;

FIG. 16 is a fragmentary perspective view similar to the end portion shown in FIG. 2;

FIG. 17 is a perspective view similar to FIG. 3;

FIG. 18 is a fragmentary plan view similar to FIG. 6 showing the "layout" affording board material savings accomplished in the production of the blank of FIG. 12;

FIGS. 21–24 are fragmentary perspective views similar to FIGS. 13–15 showing the folding sequence of the end closure flaps of the carton of FIG. 20; and FIG. 25 is a fragmentary perspective view similar to end portions of FIGS. 3 and 17, showing end portions of the carton of FIG. 20 opened.

Figure 8:
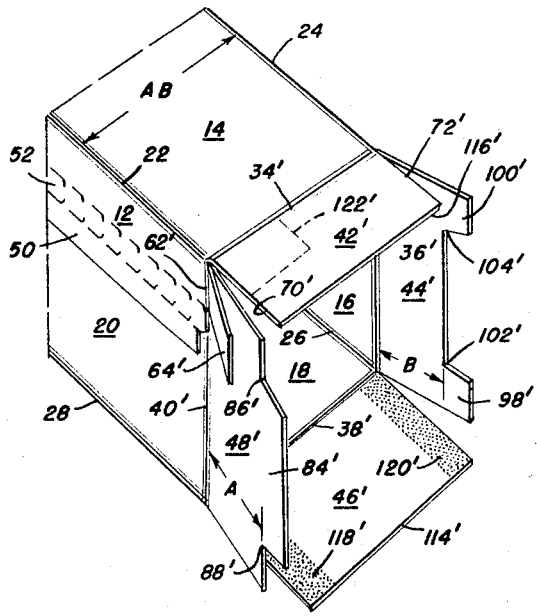
FIG. 8 is a fragmentary perspective view of a preassembled carton showing the position of the closure flaps of the end closure assembly prior to the first folding step thereof during sealing of the closure assembly.

Conventional apparatus used to erect, fill and close ice cream cartons generally will remove a single, partially or pre-assembled carton blank and close one end closure assembly thereof while the carton is disposed on end or in a vertically extending condition. Ice cream in a readily flowable state is deposited into the carton and then the other end closure is sealed.

The first closed end closure assembly must function to retain ice cream in the container, i.e. prevent the readily flowable ice cream from flowing past the closure flap of the end closure assembly upon which the ice cream rests, and the flap closing sequence and physical character of the closure flaps must be such that conventional apparatus (or slightly modified conventional apparatus) will readily operate on the pre-assembled ice cream containers or cartons of the invention.

The carton blanks preferably are of a generally rectangular shape in order to minimize cutting or waste to keep the carton material cost at a minimum.

Further, heat responsive adhesives are practical for use in sealing the end closure assemblies of cartons, and it is highly desirable that the cooperating closure flaps provide a relatively stable base against which a heat sealing pressure can be readily applied.

Referring to FIG. 1, one-piece blank of suitable board material is indicated generally at 10, and the blank is die-cut and scored in a manner familiar to those skilled in the art.

The blank 10 is of a generally rectangular shape and comprises, in order, a retaining flap panel 12, a top cover panel 14, a back panel 16, a bottom panel 18, and front panel 20.

Adjacent panels 12, 14; 14, 16; 16, 18; and 18, 20 are foldably connected to each other on mutually parallel fold lines 22, 24, 26 and 28, respectively. The panel 12 includes a free margin 30 and the panel 20 includes a slightly inwardly notched, free margin 32 and these free margins are parallel to fold lines 22–28.

The upper and lower margins of panels 14, 16, 18 and 20 are defined by fold lines 34, 34'; 36, 36'; 38, 38' and 40, 40' respectively. Foldably connected at the fold lines 34–40 and 34'–40' are end closure flaps 42, 44, 46 and 48 and similar end closure flaps 42', 44', 46' and 48', respectively.

The retaining flap panel 12 has extending the length thereof and adjacent the free margin 30 a glue strip 50 bordered by a parallel removable tear strip portion 52 formed by parallel perforated score lines 54 and 56 and the tear strip 52 inclues a terminal extension 58 to form a finger-grip portion on the finally formed carton. The panel 12 includes end margin portions 60, 60', in colinear relation with a fold line 62, 62' which foldably connects retaining flaps 64, 64' to the respective upper and lower ends of panel 12. The fold lines 62, 62' are in alignment with fold lines 34–38 and 34'–38', respectively.

The flaps 64, 64' include a side margin 66, 66', respectively, which extends beyond the line 56 to provide a good base to facilitate removal or tearing of the tear strip portion 52. It will be noted that the end margins 68 and 68' of the flaps 64, 64' respectively are relatively short, this construction facilitating the formation of a relatively flat end closure assembly on the sealed carton.

Adjacent flaps 64, 42; 42, 44; 44, 46; and 46, 48 are separated at the side edges by cut lines 70, 72, 74 and 76, respectively which originate from the upper margins of panels 12–20 and are colinear with fold lines 22–28, respectively. The side margins of flaps 42'–48' and 64' are formed by cut lines 70', 72', 74', and 76' respectively in the same relation to fold lines 22–28 and 34'–40', 62' as the cut lines 70–76.

Flaps 44, 44' and 48, 48' are conveniently described as inner closure flaps since they will be located immediately adjacent the ice cream in the erected and sealed carton to be subsequently described in detail.

The flaps 48, 48' include a free side margin 78, 78', respectively, and include free, colinear, terminal margin portions 80 and 82, and 80' and 82' terminating at the base of longitudinally extending extensions 84, 84'. Spaced abutment shoulders 86, 88 and 86' and 88' are formed at the inner ends of margin portions 80, 82 and 84, 84'. The extensions 84, 84' are flanked at opposite sides by slightly converging side margins 90, 92 and 90', 92', respectively, terminating at an extension end margin 94 and 94', parallel to fold lines 40 and 40'.

The inner closure flaps 44, 44' have the side margins thereof defined by the cut lines 72, 74 and 72' and 74' respectively. The terminal end margins of the flaps 44, 44' include an intermediate free margin portion 96, 96', respectively which terminates at the base of longitudinal extensions 98, 100 and 98', 100', respectively. The free margin portions 96, 96' form at the base of the extensions 98, 100 and 98', 100' abutment shoulder portions 102, 104 and 102', 104' which will respectively engage the abutment shoulders 88, 86 and 88', 86' of the respective flaps 48, 48' when the ice cream carton is erected or assembled, and these abutment shoulders will orient the side panels 16 and 20 into mutually parallel relationship.

The extensions 98, 100 and 98', 100' are formed by diverging side margins 106, 108 and 106', 108', respectively, which respectively terminate in colinear terminal margin portions 110, 112 and 110', 112' which intersect the cut lines 74, 72 and 74', 72', respectively.

The distance A from the abutment shoulders 86, 88 to the fold line 40, combined with the distance B between the fold line 36, and the abutment shoulders 102, 104 is substantially equal to the width AB of the top cover panel 14 and bottom panel 18. When the inner flaps 44 and 48 and 44', 48' are engaged in the manner illustrated in FIGS. 9–11, the side wall panels 16 and 20 will be maintained in mutually parallel relationship; i.e. perpendicular to panels 14 and 18, which form with panels 14 and 18 the parallelogram forming the tube. Additionally, the interengaged relationship of the terminal margins of the flaps 44, 48 and 44', 48' will prevent ice cream from passing beyond, and will also provide a relatively stable base to permit inward pressures to be exerted during heat sealing or closing of the end closure assemblies of the carton formed from blank 10.

The closure flaps 46, 46' include a terminal end margin 114, 114', respectively, parallel to the fold lines 38, 38', respectively and include side margins comprising a continuation of the cut lines 74, 76 and 74', 76', respectively. The flaps 46, 46' will be conveniently described as second outer closure flaps inasmuch as they will overlie the inner engaged inner closure flaps 44, 48 and 44', 48' as will become apparent during the description of the assembly or erection and sealing of the carton formed from the blank 10.

The flaps 42, 42' are conveniently described as first outer closure flaps and respectively include terminal end margins 116, 116', respectively, which are respectively parallel to the fold lines 34 and 34'. The combined height C and D of the first and second outer closure flaps 42, 46 is equal to the width CD of the front and rear panels 16 and 20. This same dimensional relationship exists with respect to the closure flaps 42' and 46'.

The free or terminal margins 114 and 116 and 114', 116' of the outer closure flaps will be in confronting and substantial abutting relationship in the erected carton to accordingly orient and maintain the carton as a cube in its final erected and sealed condition (see FIGS. 2 and 3, for example).

Referring to FIG. 7, a fragmentary lower portion of the blank 10 is shown in its laid out position with respect to a reversed similar end portion of a blank 10'. It will be noted that the end margins 112', 114' are formed by means of a coinciding die cut, and by using this reversed relationship of alternate blanks being formed, the distance E between the fold lines of the similar end flaps can be and is maintained at a minimum when laying out or producing the blanks. The laid out relationship disclosed, due to the closure flap end construction, affords a considerable savings of paperboard stock by utilizing common cut lines between adjacent blanks as well as having certain portions overlapped i.e. note how 46', 48' of adjacent blanks overlap, for example. This saving of material not only evolves by virtue of the common cut lines between adjacent end portions of the reversed blanks, but this saving is also afforded by the particular interlocking and shape of the structure of the inner closure flaps 44, 48 and 44', 48' which eliminates the necessity for full length end closure flaps, i.e. flaps which cover the entire end dimension of the cartons.

The second outer closure flaps 46, 46' respectively include, on the inner surface thereof, strips of heat responsive adhesive 118, 120 and 118', 120', respectively, which are disposed parallel to and inwardly of the free edge margins 76, 74 and 76', 74' of these second end closure flaps. Additionally, these first closure flaps 42, 42' have applied at the corners, bordered by fold line 34 and cut line 70 and fold line 34' and cut line 70', on the inner surfaces of the aforementioned first outer closure flaps 42 and 42', heat responsive adhesive coated areas 122 and 122', respectively, which facilitate the erection and sealing of a completely erected carton, as will presently be described.

Referring to FIG. 4, a blank 10 is first preassembled on conventional folding equipment, it being noted that the side wall panel 20 is first folded on fold line 28 into overlying relationship with respect to the panels 18 and 16. Next, the panels 14 and 12 are folded in coplanar relationship on the fold line 24 so that the panel 14 overlies the panel 16 and the panel 12 overlies the panel 20 including the free side margin 32 thereof. The glue of the strip 50, which may be heat responsive, is activated, accordingly resulting in a partially assembled carton preassembled into the condition shown in FIG. 4.

Referring to FIGS. 5 and 6, the partially assembled or preassembled carton blank is oriented from the position shown in FIG. 4 to that ultimately shown in FIG. 6 in which the panels 14, 18 and 16, 20 are disposed in mutually parallel relationship, accordingly forming a rectangular cross-section receptacle portion for the ice cream which the carton will ultimately contain; an intermediate stage of this orienting procedure is shown in FIG. 5, for example. When the preassembled, partially assembled carton has the panels 14–20 in right angle relationship (see FIG. 8), the end closure flaps 42'–48' and retaining flap 64' will be disposed in substantially the condition shown in FIG. 8, these flaps comprising an end closure assembly. The heat-responsive adhesive 122' will be on the inner surface of closure flap 42' and the strips of heat-responsive adhesive 118', 120' will be on the inner surface of end closure flaps 46'.

Figure 9:
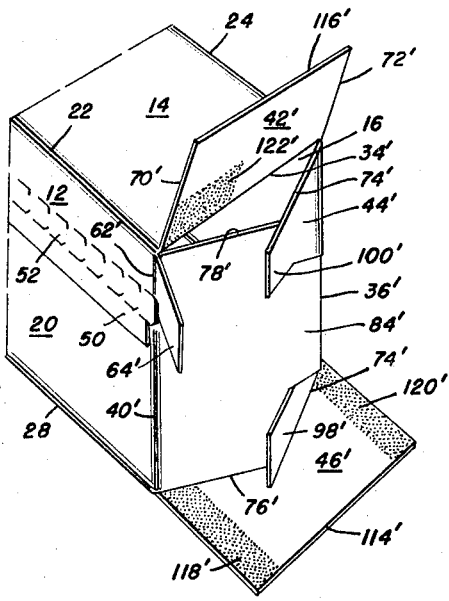
FIG. 9 is a view similar to FIG. 8 showing the inner closure flaps being folded into interlocking, orienting and sealing relationship.

Referring to FIG. 9, the inner closure flaps 44' and 48' will first be folded toward each other into overlying inner engaged relationship, and the shoulders 80', 104' and 88', 102' will be in abutting relationship. The dimensions A and B, i.e. a distance of the shoulders 86', 88' from fold line 40' and the distance between the fold line 36' and shoulders 102', 104', will be substantially equal to the dimensions AB, the width of the top cover and bottom panels 14 and 18, respectively. It will be noted that no adhesive is utilized between the inner closure flaps 44' and 48' and the extensions 84' and 98', 100' will be in overlapped or inner engaged relationship. The interengaged, overlapped free relationship of the inner flaps will substantially prevent the flow of ice cream or the like from moving through the end closure after it is ultimately formed in the condition shown in FIGS. 2 and 3. Further, as seen in FIG. 9, the fold lines 36' and 40' extend the entire height of the end closure flaps 44' and 48' respectively and accordingly prevent the flow of ice cream thereby.

Figure 10:
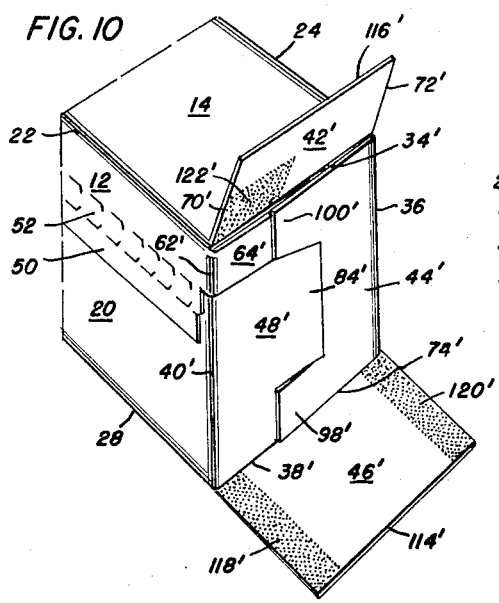
FIG. 10 is a view similar to FIG. 9 showing how a cover retaining flap is folded into juxtaposed relation ont ๖ one of the inner closure flaps, and showing how the retain · ing flap is disposed in substantially coplanar relation with one of the inner closure flaps.

Referring to FIG. 10, the inner closure flap 48' is folded toward the inner closure flap 44', the retaining flap 46' will be folded into overlying relationship with respect to the outer surface of the inner closure flap 48' and it will lie in substantially coplanar relationship with the extension 100' of the closure flap 44'. Further, the inner engaged relationship of the extensions 84' and 98', 100' provides an adequate base upon which the necessary inward pressure may be applied to cause the first outer closure flap 42' to adhere to the retaining flap 64' at the adhesive area 122' when the same is heat activated.

Figure 11:
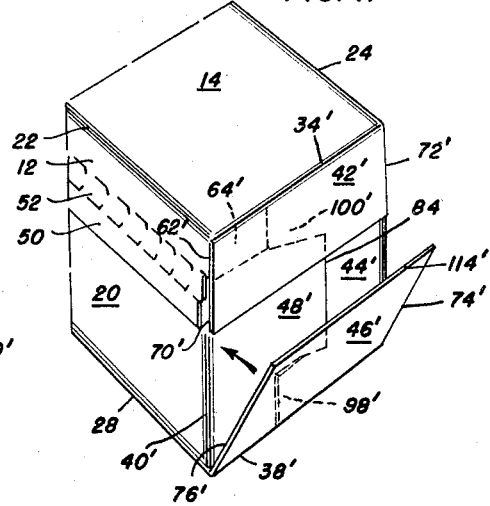
FIG. 11 is a perspective view similar to FIG. 10 showing a first outer closure flap folded into juxtaposed relation over the cover retaining flap and upper portions of the inner closure flaps, and showing a second outer closure flap partially folded to complete the sealed end closure assembly of the carton seen in FIG. 2.

Referring to FIG. 11, it will be noted that the top cover panel is hingedly connected at 24 to the rear panel 16 (see FIG. 8) and is connected to the retaining panel 12 at the fold line 22. Further, the top cover panel 14 is integral with the first outer closure flap 42' at the fold line 34' and the retaining panel 12, and after the tear strip portion 52 is removed, the panel 12 will be integral with the panel 14 and outer closure panel 42', due to the connection of the retaining flap 64' with the closure flap 42' at the hinge or fold line 62'.

After the first outer closure flap 42' is disposed in the condition shown in FIG. 11, the second outer closure flap 46' is folded or pivoted in the direction indicated by the directional arrow on FIG. 11 into the position shown in FIG. 2, and it will be noted that the free margins 114' and 116' of the closure flaps 46', 42' will be in confronting and/or substantially abutting relationship to maintain the carton in its squared up or true rectangular condition. This squared condition is especially important when a plurality of the ice cream packages are stacked one upon another during packing, shipping and storage, for example.

When the closure flap 46' moves into overlying relationship with respect to the inner closure flap 44', 48' the strips of adhesive 118', 120' will be activated by heat, for example, and provide the sole means for retaining the end closure assembly of the carton in assembled relationship. The upper and lower margins of flaps 44', 48', will extend to fold lines 34', 38' at the fold "welts" and form a substantial seal thereat and provide the edge against which flaps 42', 46' are folded.

It will be immediately noted that a minimum amount of board material is used to form the inner and outer closure flaps of the end closure assembly, and additionally a minimum amount of glue, i.e. glue strip 50, glue strips 118' and 120' and glue area 122' will be used to retain the carton in its assembled and sealed condition.

As previously mentioned, the interlocked engagement of the free marginal edge portions of the inner closure flaps 44', 48' will provide a sufficiently stable base to permit outer closure flap 46' to be urged thereagainst during heat and pressure application on the closure flap 46' to form the completed end closure assembly.

The apparatus upon which the cartons are assembled and filled will function to assemble an underlying end closure assembly while the carton is in vertically extending relationship, i.e. the end closure assembly comprising closure flaps 42'–48' will be disposed at the bottom of a carton being assembled and filled. The carton will be assembled with one of the end closure assemblies disposed on the under side and the flaps 42–48, for example, extending upwardly.

At this time a predetermined quantity of relatively free-flowing ice cream is measured into the receptacle portion formed by panels 14–20 and the upper surface of the ice cream will be disposed beneath the end closure assembly which is next to be sealed. Although the ice cream is substantially free-flowing, the outer periphery of the enclosure previously described, i.e. formed by the closure flaps 42'–48', will be formed by the fold lines 34'–40'. Additionally, the side margins 76', 78' and 72', 74' of the inner closure flaps 48' and 44', respectively, will abuttingly engage the inner surface of the fold lines 34', 38', respectively, and ice cream will not flow past the seal formed thereat. Additionally, the ice cream which is resting upon the inner surfaces of the inner engaged closure flaps 44', 48' will have to move through a tortuous path formed by the inner engaged inner closure flap extensions 84', 98', 100' before it can move toward the side edges 72', 76' and 70', 74', of the outer closure flaps 42', 46', and this movement or the escape of the ice cream is prevented by the adhered glue strips 118', 120'. Additionally, the weight of the ice cream resting on the inner surface of the assembled end closure assembly will substantially prevent the leakage of ice cream and thus the disclosed end closure assembly will be effective for the purpose intended.

Referring to FIGS. 2 and 3, after the ice cream is deposited in the receptacle portion, the end closure assembly comprising closure flaps 42–48 will be folded in the sequence described with respect to the end closure assembly comprising closure flaps 42'–48'.

The finally assembled carton assumes the appearance disclosed in FIG. 2, and it will be noted that the end portion or tab 58 of the tear strip 52 is disposed in a readily accessible position to be grasped between the individual's thumb and forefinger, for example, to be removed in its entirety from the retaining panel 12. It will be noted that the margin 66' of the retaining flap 64' will be disposed below the perforated tear line 56 which forms the upper margin of the tear strip 52, and thus provides a substantial base against which the tearing at line 56 is initiated and tearing along line 54 is facilitated by the adhered glue strip 50.

It will be noted that the perforated lines 56 include a relatively elongated leg portion 123 and inwardly extending end portion 124, i.e. inwardly, in this instance, referring to the center or longitudinal axis of the tear strip 52. When the tear strip is torn at the perforated lines 54 and 56, the tears of the board material forming the tear strip will tend to extend toward the longitudinal axis of the tear strip to provide a relatively even and uniform tear along the perforated line and prevent board delamination above and below the tear lines.

After the tear strip 52 has been removed, the carton will be in a closed condition shown in FIG. 2, and the top cover panel 14, together with the upper remaining portion of panel 12, and the closure flaps 42, 42' can be readily pivoted about the fold line 24 to gain ready access to the contents of the carton.

The carton permits ready access to its contents and can be easily opened but it may be readily closed, at which time the upper peripheral margins of the inner closure flaps 44, 48 and 44', 48', as well as the upper margin of the front panel 20, will serve to support the cover and square up the reclosed carton. Additionally, the linear abutment edges 114, 116 and 114', 116' of the outer closure flaps will once more engage to support and orient and maintain the carton in its rectangular condition even though the tear strip 52 has been removed.

It will be noted that in this particular embodiment of the carton, the cover or lid of the carton will be supported at fold line 24 and has a transverse dimension conveniently described as the narrow width of the rectangular carton. In the embodiment to be subsequently described, it will be noted that the lid of the carton and bottom of the carton have a transverse dimension substantially equal to the height of the front and rear walls 16 and 20 of the just described embodiment, i.e. the narrow and wide portions of these two embodiments are reversed.

Referring to FIGS. 12–18, another embodiment of the novel carton and end closure assembly is disclosed therein. The blank and carton of FIGS. 12–18 are similar in structure and function to that disclosed in FIGS. 1–11. However, it will be observed in the embodiment of FIGS. 12–18 that the bottom and front walls of the embodiment of FIGS. 12–18 are reversed with respect to those of the embodiment of FIGS. 1–11, i.e. access is gained to the contents of the finally assembled carton (compare FIGS. 3 and 17) at the wider dimensioned opened top of the open carton. However, in each of the embodiments, the covers or top panels may be pivoted entirely out of the way to gain complete access to the entire contents of the cartons.

Referring to FIGS. 12 and 18 and first considering FIG. 12, a blank is indicated generally at 210 and comprises a retaining panel 212, a top or cover panel 214, a rear panel 216, a bottom panel 218 and front panel 220. The panels 212–220 are substantially rectangular and adjacent panels are foldably connected on mutually parallel fold lines 222, 224, 226 and 228. The upper and lower margins of the panels 212–220 of the blank 210 are formed by colinear, mutually parallel fold lines 262, 262'; 234, 234'; 236, 236'; 238, 238'; and 240, 240'.

For purposes of comparison of the embodiment of FIGS. 12–18 with that of FIGS. 1–11, similar reference numerals with the prefix "200" etc. will be used to identify the comparable portions of the embodiment of FIGS. 12–18.

The retaining panel 212 includes a free side margin 230 and the front panel 220 includes a free side margin 232. Additionally, the retaining panel 212 has extending from opposite ends thereof retaining flaps 264, 264'; the top panel 214 includes at opposite ends thereof the first outer closure flaps 242, 242'; the rear panel 216 includes at opposite ends thereof inner closure flaps 244, 244'; the bottom panel 218 includes at opposite ends thereof second outer closure flaps 246, 246'; and the front panel 220 includes at opposite ends thereof an inner closure flap 248, 248'.

The just mentioned retaining and closure flaps foldably are hingedly connected to the respective panels 212–220 by means of the upper and lower fold lines 262, 234–240 and 262', 234'–240'.

The retaining panel 212 has formed longitudinally thereof a glue strip 250 and a tear strip 252 formed by means of perforated, mutually parallel lines 254 and 256; the tear strip including a terminal grip or tab portion 258. The side margins of the respective retaining flaps 266 and 266' of the retaining flaps 264 and 264' have the same overlapping relationship with respect to the tear strip 252 as mentioned with respect to the side margins of the retaining flaps 64, 64' of the previously described embodiment.

The adjacent margins of the retaining flaps 264, 264' and closure flaps 242–248 are formed by cut lines 270, 270'; 272, 272'; 274, 274'; and 276, 276', which are in colinear relationship with the respective fold lines 222–228.

The closure flaps 242, 242' have applied on the inner surface thereof at the intersection between the fold lines 234, 234' and cut lines 270, 270', respectively, adhesive or glue areas 322 and 322', respectively.

Further, the closure flaps 246, 246' have applied along the adjacent side margins formed by the cut lines 274, 276 and 274', 276', glue strips 318, 320 and 318', 320', respectively, connected by an intermediate transverse glue strip 321 and 321', respectively, forming thereabove pocket forming portions 323 and 323', respectively, the function of which will be subsequently described in detail with respect to assembly or erection of this embodiment of the carton.

The closure flaps 248, 248' include free spaced margins 280, 282 and 280', 282' intersecting the base of terminal extensions 284 and 284', respectively, and forming therewith spaced abutment shoulders 286, 288 and 286', 288'. Further, closure flaps 244, 244' include extensions 298, 300 and 298', 300', respectively, connected by a free margin 296 and 296' at the bases of these extensions. The free marginal edges 296, 296' form with the extensions 298, 300 and 298', 300' abutment shoulders 302, 304 and 302', 304', respectively.

The distance 2A of the shoulders 286, 288 and 286', 288' from the respective fold lines 240, 240', when combined with the distance 2B measured from the respective fold lines 236, 236' to the abutment shoulders 302, 304 and 302', 304', is equal to the width for transverse dimension 2AB, i.e. the width of the top and bottom panels 214 and 218 as indicated on FIG. 12. Thus it will be noted that the orientation feature of the shoulders 286, 288 and 302, 304 and 286', 288' and 302', 304' is the same as that of 44', 48' of the previously described embodiment.

The second outer closure flaps 246, 246' each includes free marginal end portions 314, 314'. The first outer closure flaps 242, 242' include spaced free marginal edge portions 316, 317 and 316', 317' extending into the adjacent cut lines forming the side edges of the flaps 242, 242', respectively, at the base of a longitudinally projecting tab or extension portions 319 and 319'. It will be noted that the tabs or extension portions 319 and 319' substantially conform to the configuration of the pocket portions 323 ad 323', respectively of the second outer closure flaps 246, 246'.

The distance 2C measured from the fold lines 238, 238' to the free margins 314, 314', respectively, when combined with the distance 2D measured from the respective fold lines 234, 234' and the spaced marginal portions 316, 317 and 316', 317' is substantially equal to the width 2CD of the rear and front panels 216, 220 as indicated in FIG. 12. The marginal edge portions 314, 316 and 317 and the similar marginal edge portions 314', 316' and 317' will have the same functional abutting and orienting relationship, i.e. square up the rectangular condition of the erected or assembled carton as the marginal edge portions 114, 116 and 114', 116' of the embodiment of FIGS. 1–11.

Referring briefly to FIG. 18 the lower end portion of the blank 210 is disclosed in a reversed condition with respect to a second blank 210' to illustrate the manner in which the closure flaps of the end closure assembly dovetail or mesh to permit the same type of board material savings as afforded by the blank of FIG. 1 and as illustrated and described in detail with respect to FIG. 7.

Referring to FIGS. 13–17 the blank of FIG. 12 (although not shown) is preassembled into the condition shown with respect to FIG. 4 of the previously described embodiment, i.e., the blank is folded at fold line 228 so that the panel 220 overlies the panel 218, and the panel 214 together with the retaining panel 212 is folded at the fold line 224 so that panel 214 overlies panel 216 and the glue strip 250 is activated to adhere to the outer surface of the front panel 220 which overlies the panel 218, as just described.

Considering FIGS. 13–16, FIG. 13 is similar to FIG. 8 of the previously described embodiment, and FIGS. 14, 15 and 16 are similar to FIGS. 9, 11 and the end portion of FIG. 2, respectively, the previously described embodiment. The inner closure flaps 244', 248' are folded into interengaged relationship from the condition shown in FIG. 13 to that of FIG. 14 and the retaining flap 264' is disposed in overlying relationship to the outer surface of the closure flap 248'. The first outer closure flap 242' is then folded into overlying relationship with respect to the retaining flap 264' and the inner closure flaps 244', 248', and the heat responsive adhesive 322' is activated.

It will be noted, considering FIG. 15, that the extension or tab portion 319' will depend below the spaced free margins 316', 317' which are in colinear relationship and parallel to the fold line 234' of the flap 242'. The next flap-folding sequence involves the upward pivoting of the second outer closure flap 246' from the position shown in FIG. 15 to that of FIG. 16 wherein the pocket portion 323' of the flap 246' will receive the extension 319' therein. When the flap 246' is disposed in the condition shown in FIG. 16, the heat responsive glue areas 318', 320' are activated and the end closure is assembled and sealed.

It will be noted particularly from FIG. 16 that the free edge margin 314' will abuttingly engage, for purpose of orientation, the colinear free margins 316', 317' of the first outer closure flap 242' to accordingly orient the carton in true rectangular relationship, i.e. maintaining the top panel 214 in parallel relationship with respect to the bottom panel 218, and the previously mentioned abutment shoulders will substantially orient the front and rear panels 220 and 216, respectively, in parallel relationship.

After the tear strip 252 has been removed in the manner described with respect to the embodiment of FIGS. 1–11, the top panel 214, together with the outer closure flaps 242, 242' and the remaining portion of the retaining panel 212, may be pivoted upwardly and rearwardly about the fold line 224. The extension portions 319, 319' formed on the flaps 242, 242', respectively, may be readily removed from the pocket forming portions 323 and 323' (only 323' is shown in FIG. 17). Ready access to the entire contents of the carton along the widest dimension is availed in the embodiment of FIGS. 12–18. Further, the carton may be readily reclosed wherein the extensions 319, 319' can be readily received in the pocket forming portions 323, 323', respectively, and the free orienting or abutment edges 316, 317 and 316', 317' will again engage portions of the free edges 314, 314'.

It will be noted with respect to the embodiment of FIGS. 1–11, and that of FIGS. 12–18, as well as the embodiment to be subsequently described, that all of the score and fold lines are substantially in parallel and/or normal relationship, which facilitates the ready production of cutting and scoring dies as well as providing cartons which may be conveniently assembled on conventional folding, erecting or filling equipment. Additionally, the fold "welts" at the fold lines of the end closure flaps of the end closure assemblies cooperate with the free edge or side margins of the inner closure flaps to prevent the flow of ice cream thereby. Additionally, the interlapped relationship of the inner closure flaps permit a reduced amount of board material to be used in the production of the carton blanks. Open edges of flaps are not utilized to prevent the flow of ice cream thereby, but right angle folds will prevent the relatively free flowing ice cream from flowing past them.

It is noted that the transverse glue strip portion 321' provides an additional barrier after it has been activated for the purpose of preventing ice cream from flowing thereby. However, the glue strips 118, 120 and 118', 120' of the first described embodiment are very satisfactory for the purpose intended, and provide a minimum amount of glue for the final assembly or sealing of the end closure assembly of cartons of the character involved. Further, the free end construction of the inner closure flaps 44, 48 and 44', 48', as well as 244, 248 and 244', 248' provide a "tongue-in-groove" relationship which squares off the carton and provides an interlapped relationship presenting a tortuous path to deter flow of ice cream past the overlapped edges. Further, these interlocking inner closure flaps with the "tongue-in-groove" relationship provide a substantial base against which the second outer closure flap may be pressed to provide good adherence during activation of the heat responsive adhesive.

Referring to FIGS. 19–25, there is disclosed a still further embodiment of the invention including a blank which produces a carton having the functional and structural features of the previously described embodiment. The prefix "400" etc. will be used to identify similar functional and structural relationships of the embodiments of FIGS. 19–25 in order to facilitate comparison thereof with the embodiments of FIGS. 1–11 and 12–18.

Figure 19:
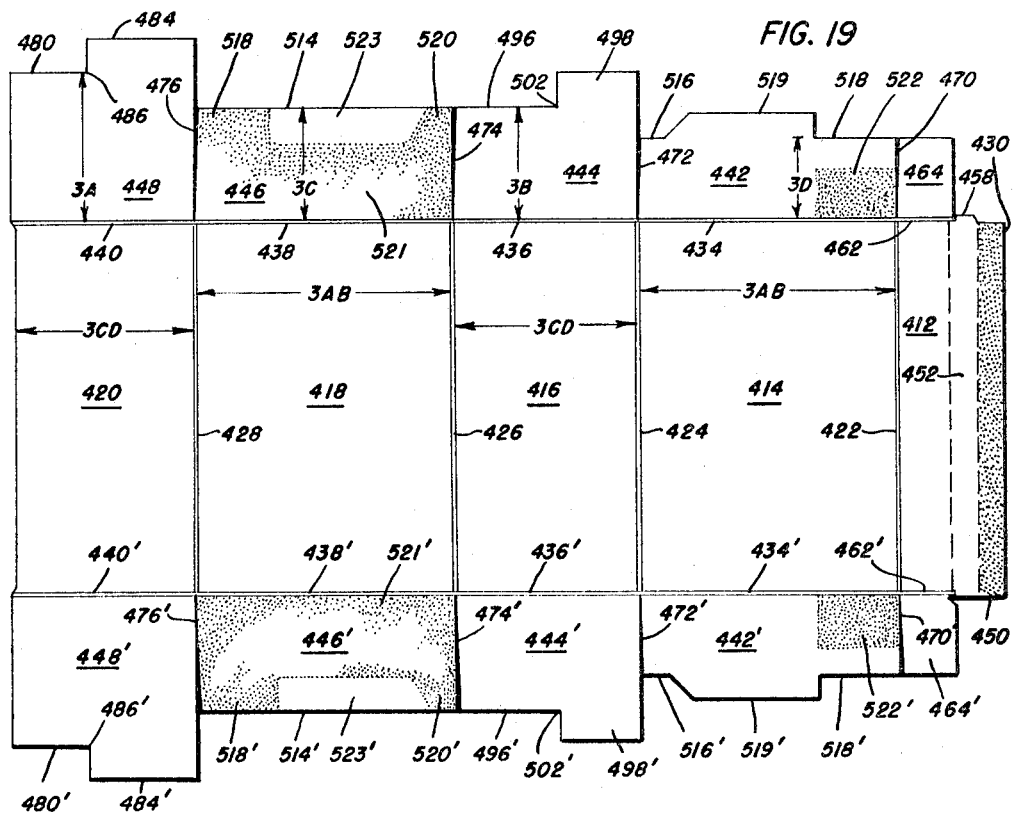
FIG. 19 is a plan view similar to FIGS. 1 and 12 and illustrating the blank used to produce still another embodiment of the novel carton.
Figure 20:
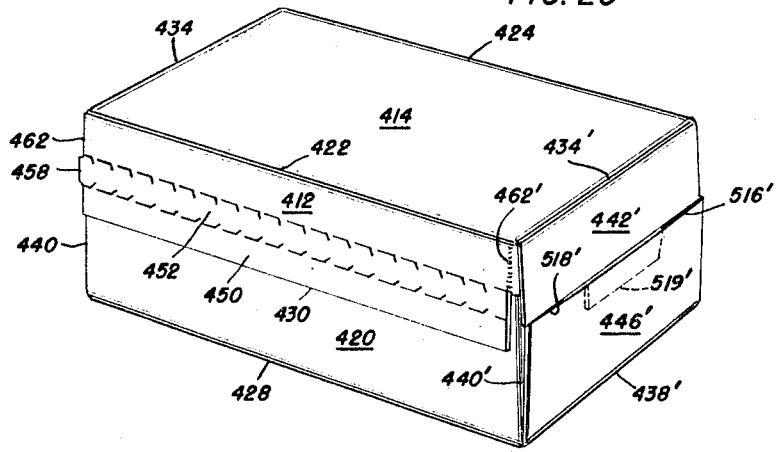
FIG. 20 is a perspective view similar to FIG. 2 showing the carton erected from the blank of FIG. 19.

Referring to FIG. 19, a blank as indicated generally at 410 has a substantially rectangular shape and may be laid out in the manner mentioned with respect to FIGS. 7 and 18, for example.

The blank 410 includes a retaining panel 412, a cover or top panel 414, a rear panel 416, a bottom panel 418, and a front panel 420. Adjacent panels 412–420 are foldably or hingedly connected to each other on mutually parallel fold lines 422, 424, 426 and 428. The retaining panel 412 includes a free margin 430 bordering a longitudinally extending glue strip 450 parallel to a longitudinally extending tear strip 452 similar in structure and function to the previously described tear strips 52 and 252. The retaining panel 412 includes from opposite ends thereof retaining flaps 464 and 464' at respective upper and lower end portions of the blank as viewed in FIG. 19. The retaining flaps 464 and 464' are foldably connected to the retaining panel 412 by means of mutually parallel fold lines 462 and 462', and the upper and lower margins of the panels 412–420 are formed by fold lines 434, 436, 438, 440 and 434'–440', respectively.

The panels 414–420 have extending from opposite ends thereof closure flaps 442, 442'; 444, 444'; 446, 446' and 448, 448' which are foldably connected at the fold lines 434–440 and 434'–440', respectively. The adjacent side edges of flaps 446 and 442–448, and 446' and 442'–448' are formed by cut lines 470–476 and 470'–476', respectively.

It will be noted that the carton produced from the blank shown in FIG. 19 (see FIGS. 20 and 25) is of the character in which the wider dimension of the carton forms the bottom and top of the completely erected and sealed carton. The closure flaps 448, 448' include a free marginal edge of substantially L-shape, extending in a common direction, and including a free margin portion 480 and 480', terminating in an intermediate abutment shoulder 486 and 486', respectively, at the base of a longitudinal extension 484 and 484', respectively.

The closure flaps 444 and 444' include a substantially L-shaped, free marginal edge including the marginal edge portion 496 terminating in an abutment shoulder 496 and 496' terminating in an abutment shoulder 502 and 502' at the base of a longitudinal extension 498 and 498', respectively. The closure flaps 444, 448 and 444', 448' are the structural and functional equivalent of the inner closure flaps 44, 48 and 44', 48' of FIGS. 1–11 and the inner closure flaps 244, 248 and 244', 248' of the embodiment of FIGS. 12–18. It will be noted in each of these embodiments that the cut lines forming the side edges of these flaps in each instance are the full width of the panels from which they extend, and these free edges of the inner closure flaps serve to orient and square up the top and bottom panels as well as the outer closure flaps of the end closure assemblies of the respective carton.

The closure flaps 446, 446' each include linear free margins 514 and 514', respectively and have applied on the inner surface thereof portions 518, 518' and 520, 520', respectively, connected by a transverse portion 521 and 521', respectively, which extends down to the fold lines 438 and 438', respectively. The transverse glue portions 521 and 521' terminate intermediately of the respective panels 446 and 446' to form pocket forming portion 523 and 523', respectively, similar in function to the pocket forming portions 323 and 323' of the embodiments of FIGS. 12–18.

The closure flaps 442 and 442' respectively include free marginal portions 516, 516' and 518, 518' which are spaced from each other and disposed in opposite sides of a suitably conformed extension or tab portion 519 and 519', respectively. The tab portions 519 and 519' are respectively received in the pocket forming portions 523 and 523' formed on the assembled or erected carton.

The distance 3A plus the distance 3B, i.e., the distance between the fold line 440 and abutment shoulder 486, and fold line 436 and abutment shoulder 502, are substantially equal to the distances 3AB, i.e., the width of the top and bottom panels 414 and 418, respectively. The same relationship holds true to the abutment shoulders 486' and 502' with respect to the fold lines of 440' and 436'. The abutment shoulders 486, 502 and 486', 502' (see FIG. 22, for example) will orient the panels 414 and 418 in substantially mutually parallel relationship in the assembled or erected and sealed carton.

Additionally, the linear margins 514 and 514' will abuttingly engage the free marginal edge portions 516, 518 and 516', 518', respectively, in the assembled carton to substantially dispose the panels 416 and 420 in mutual parallel relationship in the assembled or erected carton. In this regard, the distance 3C, when combined with the distance 3D, is substantially equal to the distance 3CD, i.e. the width of the respective panels 416 and 420.

The end closure flaps 442 and 442' each include glue areas 522 and 522', respectively, disposed at the intersections of the fold line 434 and cut line 470, and fold line 434' and cut line 470', respectively.

It will be noted in each of the embodiments that various types of heat responsive glue areas are provided on the closure flaps 46, 46'; 246, 246' and 446, 446', and it will be apparent to those skilled in the art that these different types of glue areas may be interchanged in the respective embodiments disclosed. Additionally, the glue areas 122, 122'; 322, 322'; and 522, 522' are substantially the same for the purpose of retaining the respective flaps 64, 64'; 264, 264'; and 464, 464' in their assembled relationship disclosed in FIGS. 20 and 23–25.

The blank of 319 is preassembled into the condition previously described with respect to FIG. 4 and the blank of FIG. 1. Next the inner closure flaps 444', 448' are folded inwardly toward each other as seen in FIG. 22 wherein the abutment shoulders 486' and 502' engage. The linear margins 480' and 496' also serve as abutments for orienting the panels of receptible portion of the carton and up the carton into a true rectangular cross section.

As seen in FIG. 22, the retaining flap 464 is disposed in overlying relationship to the closure flap 448', and terminates short of terminal end or adjacent end of the extension 498' so that these portions lie in substantial coplanar relationship. This relationship is also true with respect to the previously described embodiments. Next, the first outer closure flap 442' is folded into overlying relationship with respect to the retaining flap and inner closure flaps and heat and pressure are applied to the glue area 522' to activate the glue and integrate the retaining panel 412 with the outer closure flap 442'. It will be noted that the extension 519' extends below the free margins 516', 518' and when the second outer closure flap is pivoted upwardly into overlying relationship with respect to the extension or tab 519', this tab will be received in the pocket forming portion 523' of the closure flap of 446', and the edge 514' will substantially abut the colinear free marginal portions 516', 518' of the first outer closure flap 442'. FIG. 24 discloses the completely assembled end closure assembly for the carton formed from the blank disclosed in FIG. 19.

Subsequently, when it is desired to gain access to the contents of the carton formed from the blank of FIG. 19, the tear strip 452 is removed (see FIG. 25), the glue strip portion of retaining panel 412 remains on the front wall panel 420, and the top panel, together with the remaining portion of the retaining panel 412 and first outer closure flaps 442 and 442', can be pivoted about the hinge or fold line 424.

In all of the embodiments described in detail, there are provided abutment shoulders intermediately of the inner closure flaps which have a definite, dimensional relationship to properly orient the top and bottom panels of the cartons. Further, the interlocked or overlapped relation of the free margins of the inner closure flaps prevent the escape of ice cream during loading of the cartons or during transit when there may be temporary thawing of ice cream packed therein. Additionally, on all of the embodiments the outer closure panels include confronting abutment free margins which substantially orient and maintain the rectangular condition of the cartons. Still further, the interlocked relationship of the inner closure provides a substantial base against which the second outer closure flaps may be pressed during the application of heat to activate heat responsive adhesive material. Still further, as clearly indicated in FIGS. 7 and 18 (this statement being applicable to the blank of FIG. 19), the closure flaps of the end closure assemblies of the cartons are of such a character which permit a layout of the cartons to afford a substantial saving of board material in the production of the carton blanks. Additionally, the blanks of the respective cartons are of such a character that relatively slight loss of board material results in the layout, accordingly permitting less expensive packages to be produced and affording a savings to the retailer as well as the ultimate consumer.

In addition, the novel blanks are of such a character that they can be assembled, filled and sealed on conventional assembling equipment which was heretofore used with ice cream cartons having a relatively complex end closure construction. Still further, the cartons which have been described in detail are of such a character that they permit complete access to the upper opening of the carton to permit the consumer to remove the entire contents of the carton without any material loss. Still further, all of the cartons incorporate a relatively uniform or regular layout which facilitates the production of cutting and scoring dies. Further, the carton is of such a character, and this is especially important in half-gallon and gallon size cartons, wherein the cover will close in a very tight manner in which the shape of the carton is maintained during reclosure to protect the remaining contents in the carton. Further, the cartons are of such a character as to provide maximum space for art work and the like. It will be noted that the cartons are substantially tamperproof, inasmuch as the cartons must be defaced if they are to be opened, i.e., the tear strips 52, 252 and 452 must be removed. The end closure assemblies of the cartons are of such a character as to cause an absolute minimum of hangup of the cover or lid when it is opened and closed and provides a very convenient access to the contents of the carton. The cartons will maintain a pleasing appearance, i.e. substantially unniformly rectangular by virtue of the manner in which they are laid out and the manner in which the upper peripheral edges of the side and end walls of the assembled carton are disposed in relationship to the fold lines 24, 224 and 424. All of the fold and score lines are generally horizontal, keeping panel breaks at a minimum and thus substantially obviating registration problems of art work applied on the cartons. Further, the meshing of the flaps, i.e. the "tongue-in-groove" relationship of the inner closure flaps, provides a superior interlock for the end closure assemblies and affords an economy which was not heretofore present by virtue of reducing the overall lengths or extent of the closure flaps.

Still further, meshing and overlapping of the inner closure flaps provides a superior base against which inward pressures may be applied during the application of heat and pressure during final assembly of the cartons. Still further, through the utilization or production of this superior base for applying pressure and heat, a minimum amount of free-applied heat-responsive adhesive may be utilized to thus afford further economy and production.

Still further, the relatively square side edges of the inner closure flap, as well as the abutting free margins of the outer closure flaps, provide means for orienting the carton as a true cube and maintain it squared up, and further resist any twisting or tendency to deform when placed in a freezer, for example.

And finally, the tear strip is incorporated only in the retaining panels 12, 212 and 412 so that the carton is retained in its closed and tamperproof relationship. However, the side edge relationship of the retaining flaps 64, 264 and 464, i.e., the margin 66, for example, provides a stable base below the upper perforated line of the tear strip to aid in initiating the tearing of the tear strips of the cartons.

It will be obvious to those skilled in the art that various changes may be made without departing from the scope of the invention and therefore the invention is not limited to what is shown in the drawings and described in the specification but only as indicated in the appended claims.

What is claimed is:

1. In a one-piece container comprising foldably connected front, rear, bottom and cover panels defining a rectangularly cross-sectioned receptacle portion sealingly containing a viscous material such as ice cream or the like, the improvement comprising a combined orienting-and-sealing end closure assembly including a pair of inner closure flaps foldably connected to end margins of said front and rear panels and retaining the viscous material therein, said inner closure flaps including overlapping free marginal side edges extending the entire width thereof including at least one intermediate free abutment portion for maintaining said front and rear panels in mutually parallel relation and providing a base resisting inward deflection thereof and preventing said viscous material from moving thereby, an outer closure flap foldably connected to said bottom panel on a fold line normal to the end margins of said front and rear panels and secured at inner surface portions in juxtaposed relation on lower outer surface portions of said inner closure flaps, and another outer closure flap foldably connected to said cover panel on a fold line parallel to said fold line of said first outer closure flap and disposed in and retained in juxtaposed relation on upper outer surface portions of said inner closure flaps, and maintaining the carton panels in a rectangularly cross-sectioned relationship and maintaining the viscous material and container in a substantially square condition and preventing the viscous material from flowing past said end closure assembly, said outer closure flaps each including free marginal edge portions parallel to the fold lines thereof and disposed in mutually co-planar abutting relationship maintaining said cover and bottom panels in oriented parallel relationship and aiding to maintain the squared condition of the viscous material therein, said overlapping, free abutment portions of said inner closure flaps comprising at least one terminal extension portion at the side edge of one of said inner closure flaps and forming at least one intermediate abutment shoulder thereon, said other inner closure flap including at least one terminal extension extending beyond said free side edge of said other inner closure flap, said shoulders abuttingly engaging each other and spaced a distance substantially equal to the width of said cover and bottom panels, the inner edges of said inner closure flaps having a mutually inverted L-shape with respect to each other.

2. In a one-piece container comprising foldably connected front, rear, bottom and cover panels defining a rectangularly cross-sectioned receptacle portion sealingly containing a viscous material such as ice cream or the like, the improvement comprising a combined orienting-and-sealing end closure assembly including a pair of inner closure flaps foldably connected to end margins of said front and rear panels and retaining the viscous material therein, said inner closure flaps including overlapping free marginal side edges extending the entire width thereof including at least one intermediate free abutment portion for maintaining said front and rear panels in mutually parallel relation and providing a base resisting inward deflection thereof and preventing said viscous material from moving thereby, an outer closure flap foldably connected to said bottom panel on a fold line normal to the end margins of said front and rear panels and secured at inner surface portions in juxtaposed relation on lower outer surface portions of said inner closure flaps, and another outer closure flap foldably connected to said cover panel on a fold line parallel to said fold line of said first outer closure flap and disposed in and retained in juxtaposed relation on upper outer surface portions of said inner closure flaps, and maintaining the carton panels in a rectangularly cross-sectioned relationship and maintaining the viscous material and containing in a substantially square condition and preventing the viscous material from flowing past said end closure assembly, said outer closure flaps each including free marginal edge portions parallel to the fold lines thereof and disposed in mutually co-planar abutting relationship maintaining said cover and bottom panels in oriented parallel relationship and aiding to maintain the squared condition of the viscous material therein, said cover panel including a depending retaining-flap panel juxtaposed on the outer surface of said front panel and terminally connected by a foldable terminal extension to said second outer closure flap, said retaining-flap panel including tear strip means at the lower edge thereof extending the length of said retaining-flap panel and detachably connecting said cover panel to said front wall, said terminal extension including a lower margin overlapping the portion of the longitudinal projection of an upper margin of said tear strip means.

3. A carton blank comprising four foldably connected, rectangular panels, a retaining-flap panel extending the entire length of and foldably connected to an end one of said rectangular panels, said retaining-panel including tear strip means extending the entire length thereof, each of said four panels and said retaining-flap panel including flaps extending from opposite ends thereof from colinear fold lines forming end margins of said panels, said flaps extending from opposite ends of each of said four rectangular panels being separated by cut lines coincident with the fold lines between adjacent rectangular panels, the flaps of two alternate panels including free end margins having at least one intermediate abutment shoulder portion formed thereon, said shoulder portions being disposed at combined distance equal to the widths of said two other rectangular panels between the fold lines forming the side margins thereof, said free end margins of said flaps on alternate panels having an L-shape configuration extending in a common direction, said L-shaped free edges each including a leg portion coincident with said shoulder portion and extending into a cut-line at the side of the flap upon which said free edge is formed.

4. The structure of claim 2 in which said second outer closure flap is retained to said inner closure flaps by adhesive means on the inner surface thereof, said adhesive means comprising at least two strips of adhesive immediately adjacent the side margins of said second outer closure flap and extending the entire height thereof.

5. The structure of claim 4 in which said two strips of adhesive are connected by a transverse adhesive strip connecting said two strips of adhesive and terminating in an upper margin disposed below the upper free edge of said second closure flap, said first closure flap including a free, terminal extension intermediately of the lower marginal edge thereof and disposed in free removable relationship between said two strips of adhesive.

6. The structure as claimed in claim 5 in which said transverse adhesive strip covers the entire surface of said outer closure flap to a lower transverse hinged margin thereof.

References Cited by the Examiner

UNITED STATES PATENTS

| | | | |
|---|---|---|---|
| 1,869,742 | 8/1932 | Edmunds | 229—32 |
| 2,218,509 | 10/1940 | Goodyear | 229—51 |
| 2,243,421 | 5/1941 | Himes | 229—41 |
| 2,948,456 | 8/1960 | Grisetti et al. | 229—39 |
| 3,018,942 | 1/1962 | Arneson | 229—51 |
| 3,040,957 | 6/1962 | Meyers | 229—37 |
| 3,109,577 | 11/1963 | Knipp | 229—51 |
| 3,144,980 | 8/1964 | Larson | 229—51 |

JOSEPH R. LECLAIR, *Primary Examiner.*

FRANKLIN T. GARRETT, *Examiner.*

D. M. BOCKENEK, *Assistant Examiner.*